July 2, 1946.  J. I. HOAG  2,402,963
INSECT DEFLECTOR
Filed June 12, 1944
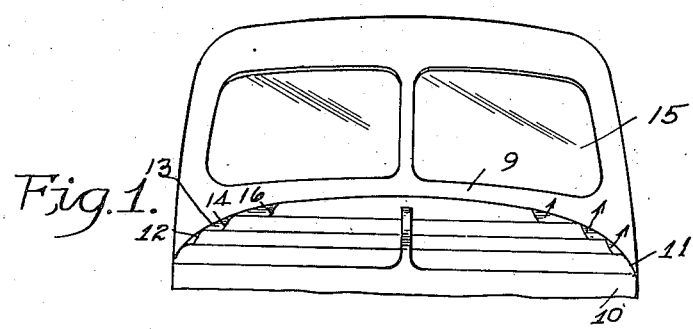
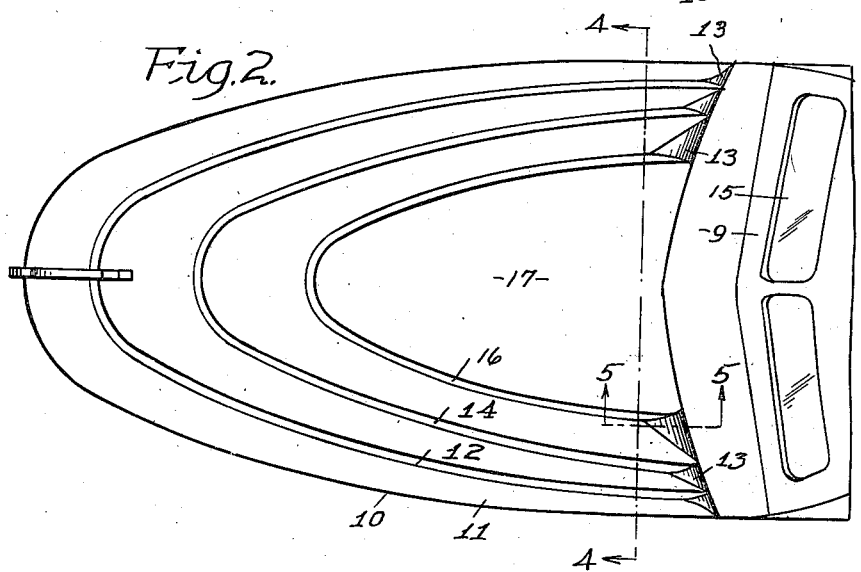
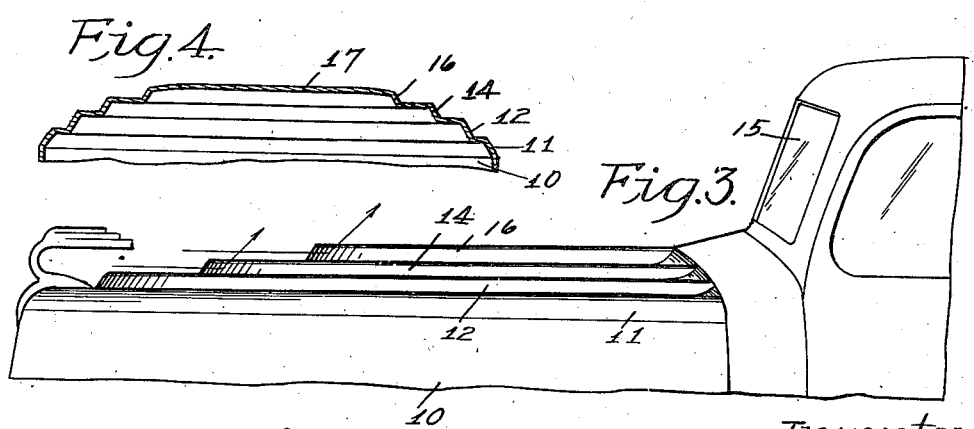
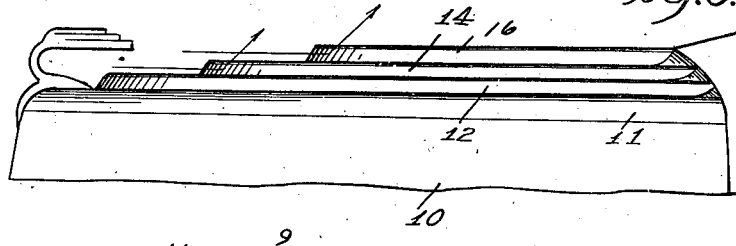
Inventor.
James I. Hoag
by Rudolph L. Lowell
atty Patented July 2, 1946

2,402,963

UNITED STATES PATENT OFFICE 2,402,963

INSECT DEFLECTOR

James I. Hoag, Bloomfield, Iowa

Application June 12, 1944, Serial No. 539,951

3 Claims. (Cl. 180—69)

This invention relates generally to insect deflectors and in particular to an insect deflector adapted to be constructed as an integral part of an automobile hood.

Insect deflectors now in general use on automobiles usually comprise a deflecting shield or shields located at the forward end of the automobile hood adjacent to the engine radiator, or at the rear end of the hood forwardly of the windshield. In either case the shields extend transversely of and project upwardly from the hood. The trend in present day automobiles is toward a streamlined design which will offer a minimum resistance to air, and yet not detract from the over-all appearance of the automobile. The commercially available insect deflectors are objectionable in that they offer an appreciable amount of resistance to the air and further generally do not blend with the design of the automobile so that they materially detract from its appearance. Also these insect deflectors are a seasonal car attachment and inconvenience is encountered in their not being available or at hand during times when they are needed.

It is an object of my invention, therefore, to provide an improved insect deflector for an automobile.

Another object of my invention is to provide an insect deflector adapted to offer a minimum of resistance to the air and to provide for insects being deflected away from the automobile windshield without the insects coming into direct striking contact with the deflector.

A further object of my invention is to provide an insect deflector which is formed as an integral part of an automobile hood so as not to detract from the over-all appearance of the automobile.

A feature of my invention is found in the provision of an insect deflector comprised of a plurality of air deflecting members carried in a concentrically spaced relation on an automobile hood within the peripheral confines of the top surface of the hood and adapted to produce air currents over the hood capable of carrying bugs upwardly and out of striking engagement with the automobile windshield.

Further objects, features and advantages of my invention will become apparent from the following description when taken in connection with the accompanying drawing in which:

Fig. 1 is a front end elevation of the upper portion of an automobile hood and a part of a windshield showing my insect deflector formed as an integral part of the hood;

Fig. 2 is an enlarged plan view of Fig. 1;

Fig. 3 is an enlarged side elevation of the hood shown in Fig. 1;

Fig. 4 is a sectional view taken on the line 4—4 in Fig. 2; and

Fig. 5 is a detail sectional view as seen on the line 5—5 in Fig. 2.

With reference to the drawing I have indicated generally by the reference numeral 10 the body of an automobile hood, which as shown in Fig. 2 is of a substantially semi-oval shape with its nose portion at the forward end of the automobile and its rear portion 9 terminating at the windshield 15. The upper surface of the hood body 10 is defined by a streamlined marginal edge portion 11 having its rear ends terminating in the hood rear portion 9.

Spaced inwardly from the marginal edge 11 and in a concentric relation therewith is a rib or step 12 of generally semi-oval shape, the nose and side portions of which are inclined upwardly and inwardly, as shown in Figs. 1 and 3, with the rear ends of the side portions terminating at the rear hood portion 9 in rearwardly and upwardly curved portions 13. The entire rib 12 is above the top level of the marginal edge 11, with the top of the rib 12 sloping upwardly and rearwardly in conformance to the front to rear slope of the margin portion 11.

Spaced apart rearwardly and inwardly from the step 12 is a second similar step 14. Inwardly spaced from the step 14 is a third step 16 substantially like the step 14.

Thus from a consideration of Figs. 2 and 4 it is seen that the steps 12, 14 and 16 take place progressively upwardly and inwardly from the marginal hood portion 11 and are concentrically arranged in a spaced relation between the marginal portion 11 and the top 17 of the hood, which also constitutes the top of the step 16. Each step is inclined upwardly and inwardly a like amount so that air passing over the marginal hood portion 11 is deflected upwardly by the step 12, air passing over the top of the step 12 is deflected upwardly and rearwardly by the step 14, and the air passing over the top of the step 14 is deflected upwardly and rearwardly by the step 16, as indicated by arrows in Figs. 1 and 3. As a result the steps 12, 14 and 16 constitute a series of deflector members for deflecting air upwardly from the hood 10 whereby the top of the hood is screened by a series of spaced air paths corresponding to the peripheral contour of the hood portion 11. Air at the rear ends of the steps 12, 14 and 16 is deflected upwardly, by the curved portions 13 as indicated by the arrows in Fig. 1, whereby to eliminate eddy currents and air pockets at such rear ends.

In the practice of my invention I have selected a modern streamlined automobile and driven it at various speeds at a time when there were numerous insects in the air, with the result that the windshield was soon obscured with the bodies of insects. Then under the same condition I have applied to the top of the same hood a detachable deflector similar to that shown in the accompanying drawing and secured it in position on the hood with bolts. With the deflector thus positioned and driving at varying speeds the windshield was maintained entirely free of insects. Further at relatively high speeds the amount of air resistance was not perceptively different from that before my deflector was applied, and appreciably less than the air resistance encountered when other insect deflectors now on the market were used.

The air currents produced by the ribs 12, 14 and 16 are of a sufficient velocity to carry all insects upwardly and out of the path of the windshield. I have found that insects ride the air currents. As a result the insects do not contact the steps 12, 14 and 16 but are carried adjacent to the steps in the air currents created thereby and then upwardly away from the automobile windshield.

From a consideration of the above description it will be seen that my invention provides a streamlined insect deflector which does not substantially increase the wind resistance of an automobile hood, and which is capable of being formed as an integral part of the hood without detracting from the appearance of the automobile. My deflector is efficient to maintain the windshield free of insects at all rates of travel of the automobile, and without the insects striking the deflector so as to be carried thereon. Although I have referred to my deflector as being positioned on the automobile hood it is to be understood that this term is also to include any portion of an automobile body located forwardly of the windshield, such as is contemplated for future car designs and in which designs the engine is to be carried at the rear of the automobile.

It is to be understood further that although I have described my invention with respect to a preferred embodiment that it is not to be so limited since modifications can be made therein which are within the full intended scope of my invention as defined by the appended claims.

I claim:

1. An insect deflector adapted to be carried on an automobile hood having an upper peripheral edge, said deflector comprising a rib having a front portion and rearwardly diverging side portions continuous therewith, with said rib being above the top level of said peripheral edge and spaced inwardly therefrom to provide a substantially horizontal surface between said peripheral edge and the front portion and side portions of said rib, with said front portion and side portions being inclined upwardly and inwardly so that air passing over said horizontal surface is deflected upwardly by said portions, and a second rib above the top level of said first rib having a front and side portions spaced inwardly from the corresponding portions of said first rib, with the front and side portions of said second rib being inclined upwardly and inwardly, and of a vertical height substantially equal to the vertical height of the front and side portions of said first rib, said second rib acting to deflect upwardly the air passing over the top surface of said first rib.

2. An insect deflector adapted to be integrally formed with an automobile hood having a top peripheral edge with a nose portion at the front of the automobile hood, said deflector comprising a first rib concentric with and spaced inwardly from said peripheral edge and having an inwardly and upwardly inclined air-deflecting surface, a second rib spaced inwardly of and concentric with said first rib and having an upwardly and inwardly inclined air-deflecting surface, with said second rib being arranged entirely above the top level of said first rib, and said first rib above the top level of said peripheral edge so that substantially horizontal surfaces are provided between said peripheral edge and said first rib and between said two ribs, with the rear ends of said two ribs terminating in a rear portion of the automobile hood.

3. An insect deflector integrally formed with an automobile hood having a body member with a top marginal edge, said deflector comprising a first upright rib on said body member in concentric arrangement with said marginal edge and spaced inwardly from said marginal edge, a second upright rib on said first rib spaced inwardly therefrom and in concentric arrangement therewith, with said marginal edge and said first rib, and said two ribs, being connected together by substantially horizontal portions, said hood body member having an upwardly and rearwardly inclined rear portion, and the rear ends of said two ribs terminating in said rear portion, with the side portions of said two ribs being inclined upwardly and inwardly to provide deflecting surfaces to deflect upwardly air striking thereagainst.

JAMES I. HOAG.